(12) United States Patent
Honzek et al.

(10) Patent No.: US 8,011,466 B2
(45) Date of Patent: Sep. 6, 2011

(54) UTILITY VEHICLE, IN PARTICULAR AN AGRICULTURAL TRACTOR

(75) Inventors: Robert Honzek, Oberthingau (DE);
Gerhard Mariner, Bidingen (DE);
Guido Nägele, Marktoberdorf (DE);
Georg Schwarz, Biessenhofen (DE)

(73) Assignee: AGCO GmbH., Marktoberdorf (DE)

( * ) Notice: Subject to any disclaimer, the term of this patent is extended or adjusted under 35 U.S.C. 154(b) by 638 days.

(21) Appl. No.: 11/740,145

(22) Filed: Apr. 25, 2007

(65) Prior Publication Data

US 2007/0246278 A1    Oct. 25, 2007

(30) Foreign Application Priority Data

Apr. 25, 2006    (GB) .................................. 0608120.2

(51) Int. Cl.
*B60K 11/04* (2006.01)
*B62D 21/00* (2006.01)
(52) U.S. Cl. ..................... 180/68.4; 180/305; 180/311
(58) Field of Classification Search .............. 180/65.1, 180/54.1, 242, 247, 291, 305, 307, 311, 312; 280/782
See application file for complete search history.

(56) References Cited

U.S. PATENT DOCUMENTS

| | | | | |
|---|---|---|---|---|
| 2,035,212 | A * | 3/1936 | Alborn ........................ | 180/54.1 |
| 3,084,971 | A * | 4/1963 | Schilberg .................... | 296/35.1 |
| 3,865,209 | A * | 2/1975 | Aihara et al. ................ | 180/65.1 |
| 4,040,640 | A | 8/1977 | Begg | |
| 5,823,285 | A * | 10/1998 | Tsuchihashi et al. ......... | 180/242 |
| 6,260,645 | B1 * | 7/2001 | Pawlowski et al. .......... | 180/65.22 |
| 6,425,450 | B1 * | 7/2002 | Lansberry .................... | 180/9.36 |
| 6,655,486 | B2 * | 12/2003 | Oshikawa et al. ........... | 180/68.1 |
| 6,758,301 | B2 * | 7/2004 | Shiba et al. .................. | 180/383 |
| 7,316,287 | B2 * | 1/2008 | Ohashi et al. ................ | 180/307 |

(Continued)

FOREIGN PATENT DOCUMENTS

EP    1736348 A    12/2006

(Continued)

OTHER PUBLICATIONS

British Search Report for related British Application No. GB0608120.2 dated Aug. 7, 2006.
European Search Report for EP 07007515.5.

*Primary Examiner* — Jeffrey J Restifo
*Assistant Examiner* — Bridget Avery

(57) ABSTRACT

A vehicle, in particular an agricultural tractor, is disclosed with a vehicle chassis, which is formed at least partly from two laterally spaced side members (1, 2) with C-shaped profile, comprising a vertical bar (1a, 2a) and two horizontal flanges (1b, 2b) and containing hydraulic lines in the space between the flanges, and with a radiator sub-assembly (5), fitted to the vehicle chassis, which consists of a carrier plate (6) fitted to the side members and several oil coolers (8, 9) supported by the carrier plate. In order to improve the routing of the hydraulic lines to the oil coolers and to provide unhindered assembly and simple subsequent maintenance, it is proposed that the open sides of the C-profile of the side members (1, 2) should point to the vehicle exterior, that at least one subsection (6b) of the carrier plate (6) extends into the region between the side members (1, 2) and that ducts (6g, 6h, 6j, 6k), connected to the oil coolers (8, 9) are integrated into the at least one subsection (6b) of the carrier plate (6) and flow into lateral ports (6l, 6m, 6n, 6p) turned towards the vertical bars (1a, 2a) and can be connected through recesses (1c, 2c) in the bars (1a, 2a) to hydraulic lines (12, 13, 14, 15) laid between the flanges (1b, 2b).

5 Claims, 5 Drawing Sheets

U.S. PATENT DOCUMENTS

| | | | |
|---|---|---|---|
| 7,325,518 B2 * | 2/2008 | Bering | 123/41.01 |
| 7,337,611 B2 * | 3/2008 | Sakikawa | 60/487 |
| 7,392,867 B2 * | 7/2008 | Akashima et al. | 180/6.38 |
| 7,419,186 B2 * | 9/2008 | Murakami et al. | 280/781 |

FOREIGN PATENT DOCUMENTS

| | | |
|---|---|---|
| GB | 1436926 | 5/1976 |
| JP | 9002323 | 1/1997 |
| JP | 09002323 A | 1/1997 |

* cited by examiner

UTILITY VEHICLE, IN PARTICULAR AN AGRICULTURAL TRACTOR

BENEFIT CLAIM

This application is based on, and claims the benefit of priority to, UK application GB 0608120.2, filed Apr. 25, 2006, which priority application is hereby incorporated by reference.

BACKGROUND OF THE INVENTION

1. Field of the Invention

The invention relates to a utility vehicle, in particular an agricultural tractor, with a vehicle chassis, which is formed at least partly from two laterally spaced side members with C-shaped profile, comprising a vertical bar and two horizontal flanges, and containing hydraulic lines in the space between the flanges, and with a radiator sub-assembly fitted to the vehicle chassis, which consists of a carrier plate fitted to the side members and several oil coolers supported by the carrier plate.

2. Description of Related Art

With a well-known vehicle of this type (own make) the side members are installed with flanges turned towards each other and form a base element for the engine and a radiator sub-assembly, arranged related to the driving direction in front of the engine, including several radiators for different coolants. The radiators usually comprise a water cooler for the engine, a transmission oil cooler, a hydraulic oil cooler, an intercooler and possibly a condenser for an air-conditioning system.

Because of the need for a good view from the driver's seat onto implements attached at the front of the vehicle on the one hand and the desire for better agility of the vehicle through tighter turning of the steering front wheels on the other hand, the region of the vehicle, in which the radiator sub-assembly is arranged, must be kept as narrow and low as possible. The radiator sub-assembly is therefore subject to substantial restrictions with respect to its dimensions particularly in width and height. Since the heat sink of the radiators cannot therefore be substantially increased, dissipation of the resultant waste heat is presenting more and more difficulties, particularly because of the trend to constantly increase the drive power of the vehicle. In order to obtain satisfactory heat dissipation however, the radiators are arranged on several levels one behind the other.

Such a radiator sub-assembly for agricultural tractors (own make), in which the radiators are fitted to a common carrier plate, is known. The carrier plate is fitted directly in front of the engine on an approximately horizontal level to the longitudinal frames in the front axle region of the vehicle. A transmission case via whose transmission a front power take-off shaft can be operated with a selectable rpm is housed between the longitudinal frames. So that the feed and outlet lines for the coolants at least of the front radiators can be routed underneath the carrier plate rearwards to the sub-assemblies to be cooled, the carrier plate is arranged at sufficient distance from the transmission case. There is also the disadvantage that the lines which lie within the profile of the side members are invisible from the outside of the vehicle and can only be accessed with difficulty thus substantially slowing assembly work in view of the cramped space conditions. In addition, the maximum size of the heat sink of the radiators is reduced by the higher lying carrier plate which needs to be spaced from the transmission case.

The object of the invention, in the case of an agricultural tractor of the type described at the beginning, is to improve the routing of the inlet and outlet lines of the front oil coolers with a view to improving assembly and simplifying subsequent maintenance.

BRIEF SUMMARY OF THE INVENTION

The object is achieved by the fact that the open sides of the C profile of the side members point to the vehicle exterior, that at least one subsection of the carrier plate extends into the region between the side members and that ducts, connected to the oil coolers, are integrated into the at least one subsection of the carrier plate and flow into lateral ports turned towards the bars and can be connected through recesses in the bars to hydraulic lines laid between the flanges.

Because the ducts exiting the oil coolers are integrated in the carrier plate, it is possible at this point to dispense with hose connections for feeding and removing the coolants to and from the corresponding oil coolers, which takes up a disproportionate amount of space. The run and cross section of the ducts in the carrier plate, which assume this function, can be adapted in wide margins to the structural conditions underneath the carrier plate. The ducts, therefore, run where there is sufficient distance between the carrier plate and the adjacent components. When the carrier plate is formed as a casting, in particular, it is easy to achieve the necessary cross section for the ducts by choosing a lower height with correspondingly greater width for the ducts. The height gain resulting therefrom can be used to arrange the carrier plate nearer the side members and so, with dimensions of the front vehicle region otherwise remaining the same, increase the heat sinks of the oil coolers. Because the open sides of the C-profile of the side members point to the vehicle exterior and a subsection of the carrier plate extends between the side members, the ducts can be connected in a simple way through recesses in the bars to the hydraulic lines which run along the side of the vehicle and are housed between the flanges of the C-profile. All these connections are also easy to access for maintenance and repair in the future. Thus the radiator sub-assembly represents a compact, separately pre-mounted sub-assembly, to which during assembly of the agricultural tractor only the feeder lines running along the side of the vehicle must be fitted.

BRIEF DESCRIPTION OF THE DRAWINGS

The invention is described in detail, by way of example only, with reference to the accompanying drawings in which.

DETAILED DESCRIPTION OF PREFERRED EMBODIMENTS

Figure 1:
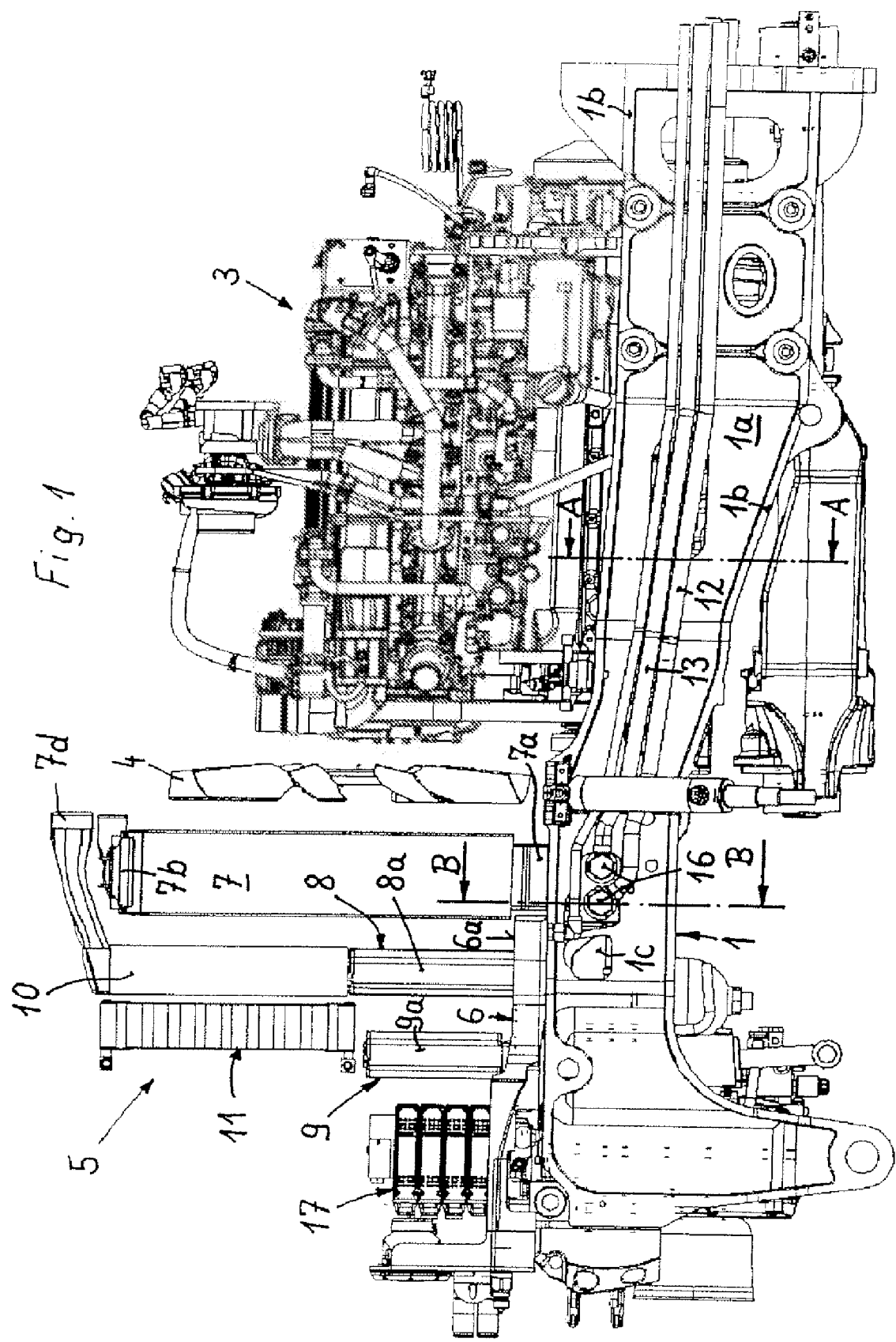
FIG. 1 shows the front region of the vehicle chassis of an agricultural tractor in a side view.
Figure 2:
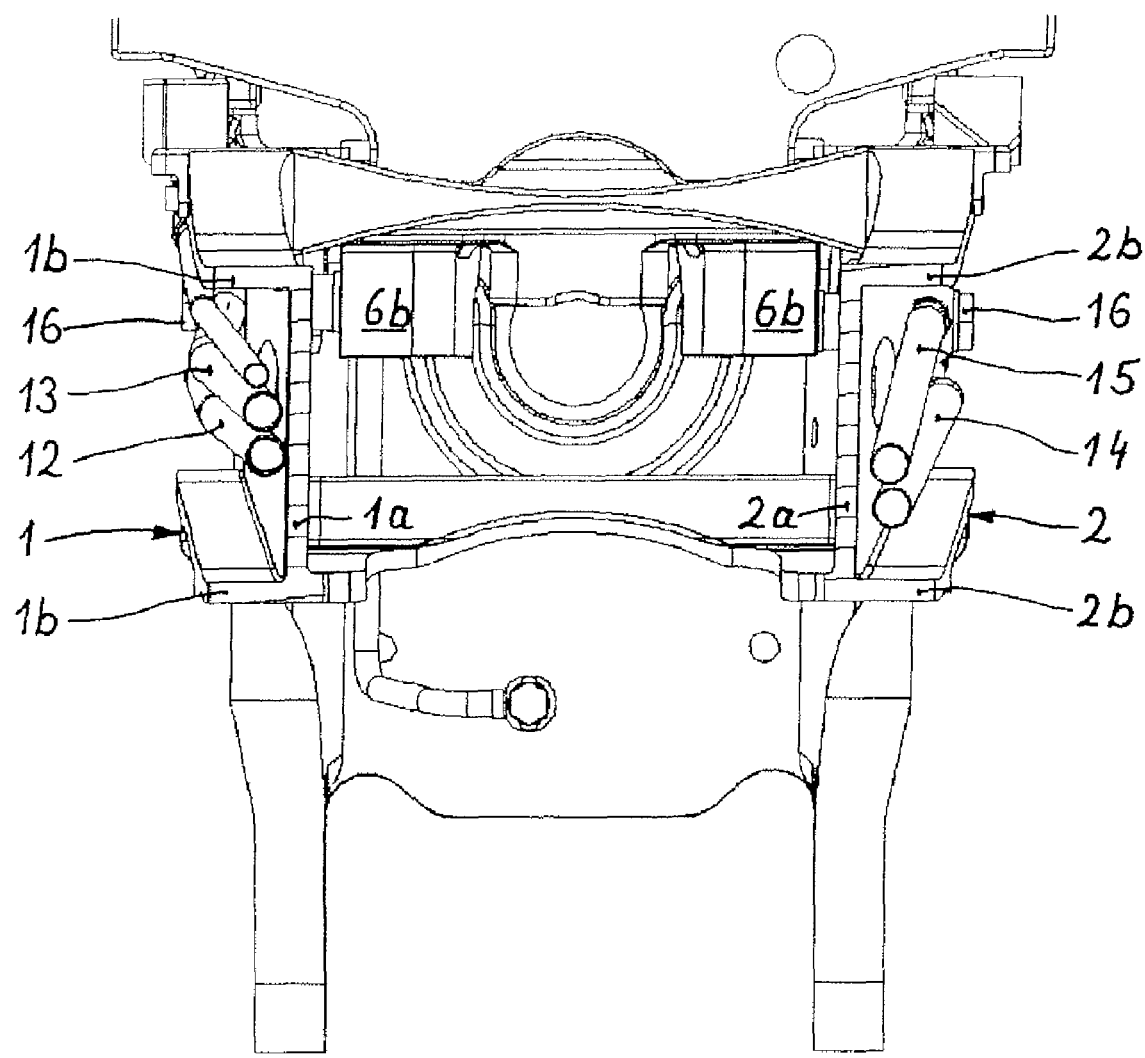
FIG. 2 is a cutaway view of the vehicle chassis along line A-A in FIG. 1.
Figure 3:
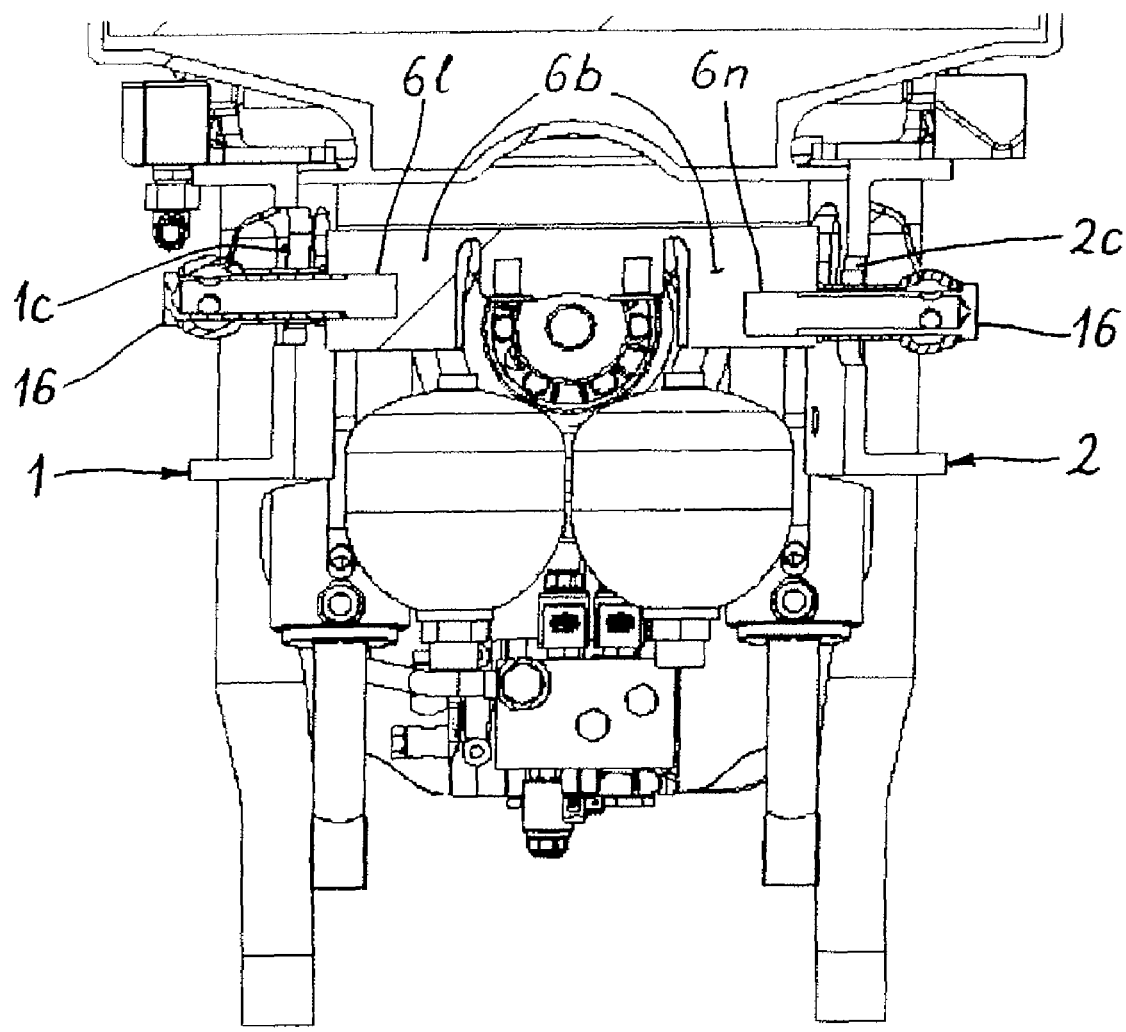
FIG. 3 is a cutaway view of the vehicle chassis along line B-B in FIG. 1.

The front region of the vehicle chassis of an agricultural tractor, as evident from FIGS. 1 to 3, consists of two laterally spaced side members 1, 2, which, seen in the driving direction, support an internal combustion engine as engine 3, a fan 4 and a radiator sub-assembly 5. The side members 1, 2 have a C-shaped cross section with a vertical bar 1a, 2a as well as two horizontal flanges 1b, 2b and are arranged in such a way that the vertical bars 1a, 2a are back to back and thus the open sides of the C-profiles point to the vehicle exterior.

The radiator sub-assembly 5 has a carrier plate 6 fitted to the side members 1, 2 by bolting or welding for a water cooler 7 for cooling the engine 3, a transmission oil cooler 8 and a hydraulic oil cooler 9. By means of supporting elements—not illustrated—an intercooler 10 is arranged above the transmission oil cooler 8 and an air-conditioning system condenser 11 is arranged above the hydraulic oil cooler 9.

Figure 4:
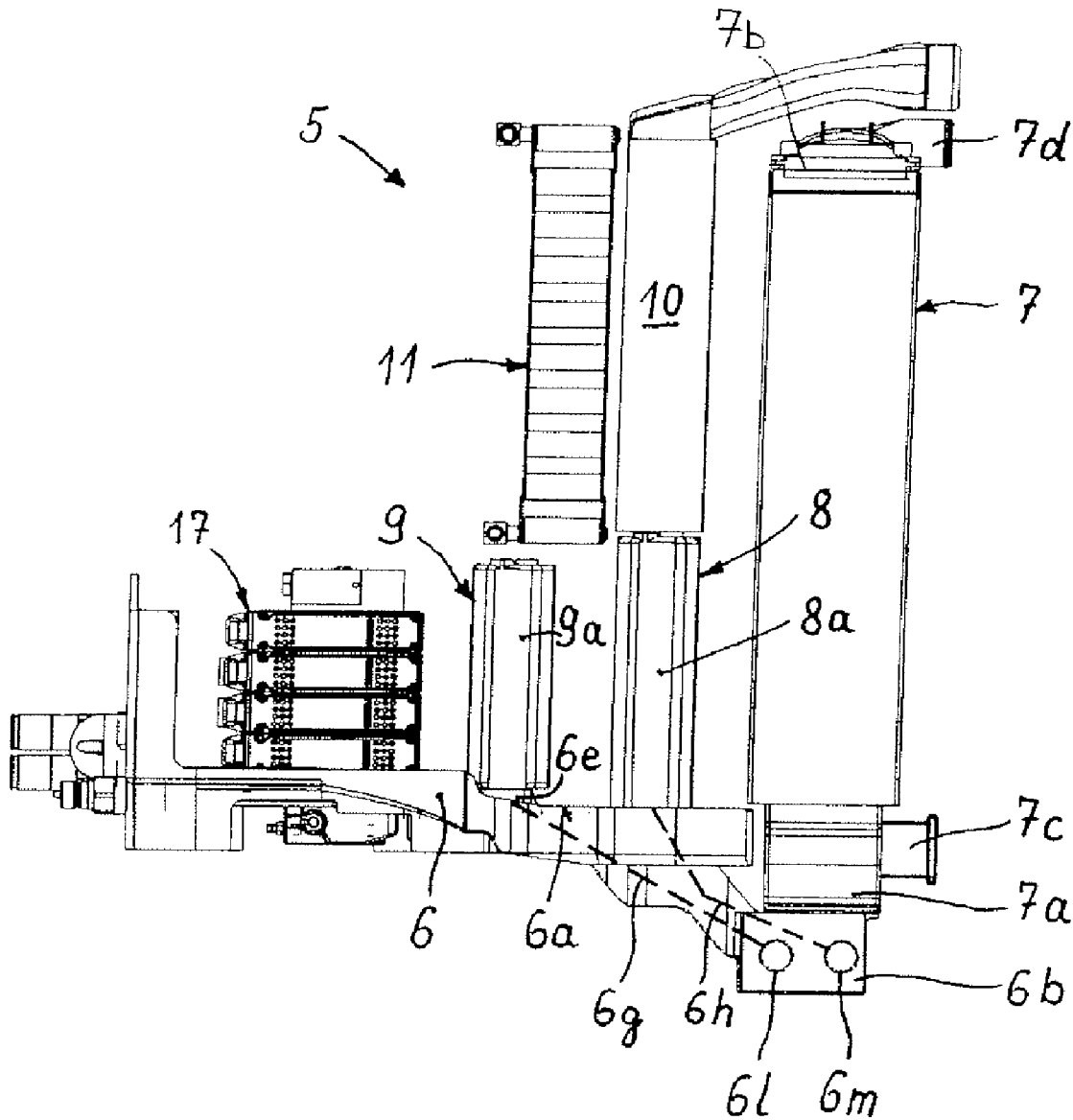
FIG. 4 is a side view of a carrier plate fitted on the vehicle chassis as part of a radiator sub-assembly and FIG. 5 shows the carrier plate in a plan view.

As also shown in FIG. 4, the water cooler 7, the transmission oil cooler 8 and the hydraulic oil cooler 9 are fitted by means of bolts—not illustrated—upright on the carrier plate 6. The oil coolers 8, 9 in this case have vertically standing oil tanks 8a, 9a, which are connected to ports 6c, 6d, 6e, 6f in the carrier plate 6 for feeding and removing the oil. By contrast the water cooler 7 with horizontally lying water tanks 7a, 7b is installed with ports 7c, 7d directed rearwards for feeding and removing the cooling water. So that the lower edges of the heat sink of the oil coolers 8, 9 and water cooler 7 lie at least approximately on the same level, the bearing surface 6a of the carrier plate 6 is located in the vicinity of the oil coolers 8, 9 above the side members 1, 2, while a subsection 6b of the carrier plate 6, on which the water cooler 7 is arranged, extends in a lower position between the side members 1, 2 into direct proximity with the bars 1a, 2a. The effective heat sink of the water cooler 7 could be substantially increased as a result of this lower position of the subsection 6b.

Figure 5:
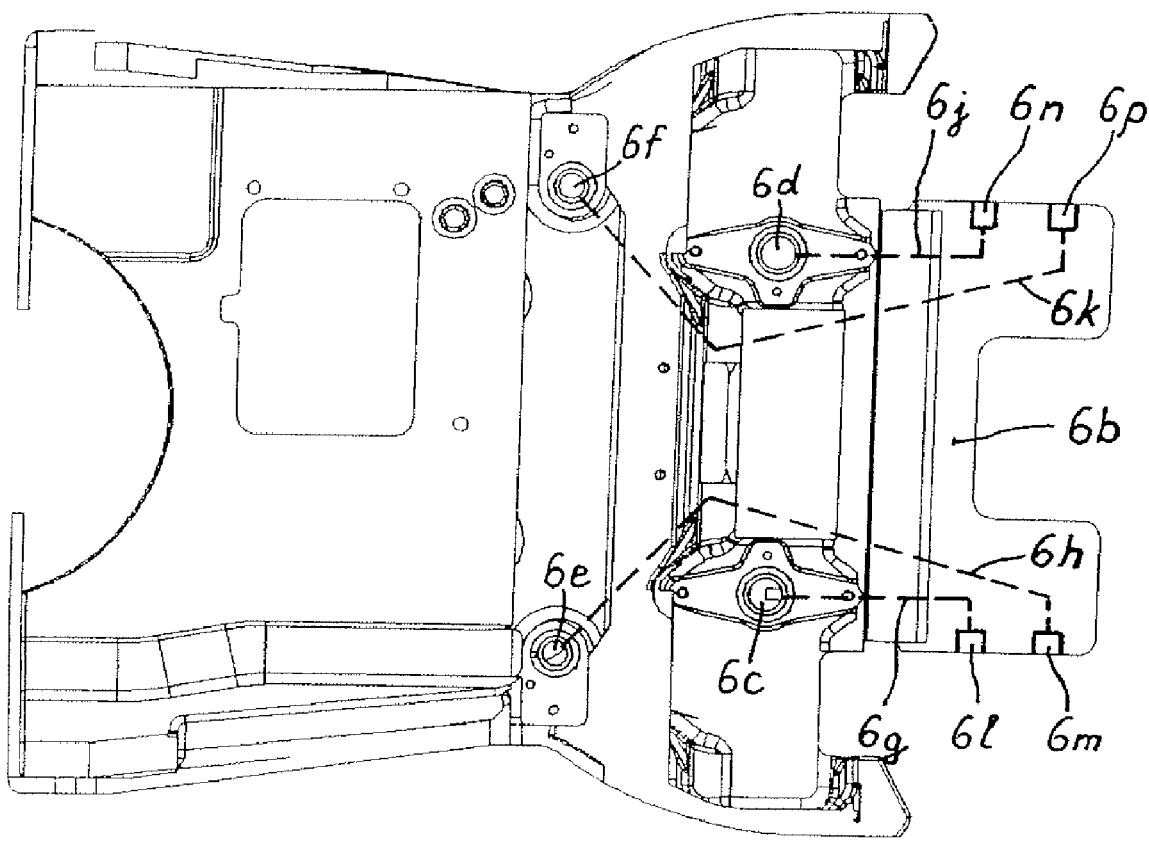

As indicated in FIG. 5, ports 6c, 6d, 6e and 6f which are connected with oil coolers 8, 9 are connected with ducts 6g, 6h, 6j and 6k, which are integrated within the carrier plate 6 which is made as a casting. These ducts exit the sides of the lower subsection 6b of the carrier plate 6 which face the bars 1a, 2a as ports 6l, 6m, 6n and 6p, which can be accessed through recesses 1c, 2c provided in the bars 1a, 2a. Hydraulic lines 12, 13, 14, 15, easily accessible from the outside, laid between the flanges 1b, 2b of the side members 1, 2, are connected via swivel joints 16 known per se to these ports. The hydraulic lines 12, 13 housed on the left side of the vehicle conduct oil heated by the transmission or the hydraulic system via the swivel joints 16 and the ducts 6g, 6h in the carrier plate 6 to the associated oil coolers 8, 9, whereas the cooled oil flowing from these oil coolers is returned via the ducts 6j, 6k in the carrier plate 6, the swivel joints 16 and hydraulic lines 14, 15 laid on the right side of the vehicle to the transmission or to the hydraulic system.

In addition to the ducts 6g, 6h, 6j, 6k described above, further ducts (not illustrated) may be provided in the carrier plate 6, which are also connected to hydraulic lines (not illustrated) laid between the flanges 1b. By means of these further ducts a valve block 17 arranged in the front region of the carrier plate 6 is connected to the hydraulic system of the vehicle, via which hydraulically-driven front attachments are supplied with pressure medium.

KEY

1 Side member
   1a bar; 1b flange top and bottom; 1c recess
2 Side member
   2a bar; 2b flange top and bottom; 2c recess
3 Engine
4 Fan
5 Radiator sub-assembly
6 Carrier plate
   6a bearing surface; 6b subsection; 6c, 6d port for 8; 6e, 6f port for 9;
   6g-6h duct to 8 or 9; 6j, 6k duct from 8 or 9; 6l, 6m port to 8 or 9;
   6n, 6p port from 8 or 9;
7 Water cooler
   7a water tank bottom
   7b water tank top
   7c port top
   7d port bottom
8 Transmission oil cooler
   8a oil tank
9 Hydraulic oil cooler
   9a oil tank
10 Intercooler
11 Air-conditioning system condenser
12-15 Hydraulic line
16 Swivel joint
17 Valve block

We claim:

1. A utility vehicle with a vehicle chassis, the vehicle chassis comprising:
   two laterally spaced side members with a C-shaped profile, each side member having a vertical bar and two horizontal flanges and containing hydraulic lines in the space between the flanges, and
   a radiator sub-assembly,
   wherein the radiator sub-assembly has a carrier plate fitted to the side members and several oil coolers supported by the carrier plate, a bearing surface of the carrier plate being located above the side members,
   wherein the open sides of the C-profile of the side members point to the vehicle exterior,
   wherein at least one subsection of the carrier plate extends into a lower position between the side members into direct proximity with the vertical bars of the side members, and
   wherein ducts connected to the oil coolers are integrated into the at least one subsection of the carrier plate and flow into lateral ports turned towards the side member vertical bars and are connected through recesses in the bars to hydraulic lines laid between the horizontal flanges.

2. A vehicle according to claim 1 in which the carrier plate is formed as a casting.

3. A vehicle according to claim 1 in which the carrier plate is welded or bolted onto the side members.

4. A vehicle according to claim 1 in which further ducts are provided in carrier plate which are connected to hydraulic lines laid between the flanges, these further ducts are connected to a valve block arranged on the carrier plate through which pressurised hydraulic fluid can be provided to operate attachments carried on the vehicle.

5. A vehicle according to claim 1 in which the vehicle is an agricultural tractor.

* * * * *